United States Patent [19]

Twerdochlib

[11] Patent Number: 4,827,487
[45] Date of Patent: May 2, 1989

[54] DISTRIBUTED TEMPERATURE SENSING SYSTEM FOR STATOR WINDINGS

[75] Inventor: Michael Twerdochlib, Oviedo, Fla.

[73] Assignee: Westinghouse Electric Corp., Pittsburgh, Pa.

[21] Appl. No.: 131,703

[22] Filed: Dec. 11, 1987

[51] Int. Cl.⁴ .......................... G01J 5/02; G01K 13/00
[52] U.S. Cl. .................... 374/152; 310/338; 374/117; 374/131
[58] Field of Search ........................ 374/152, 131, 117

[56] References Cited

U.S. PATENT DOCUMENTS

| | | | |
|---|---|---|---|
| Re. 31,685 | 9/1984 | Weiler | 374/152 |
| 3,960,017 | 6/1976 | Romanowski | 374/152 |
| 4,362,057 | 12/1982 | Gottlieb et al. | 374/152 X |
| 4,650,346 | 3/1987 | Iehon | 374/117 |
| 4,673,299 | 6/1987 | Dakin | 374/161 X |
| 4,676,665 | 6/1987 | Twerdochlib | 374/152 |

Primary Examiner—Daniel M. Yasich

[57] ABSTRACT

Method and apparatus for monitoring temperature along coil sections in a winding of an electromagnetic machine wherein each coil section comprises a plurality of electrical conductors. One or more hollow core conductors are placed in each coil section during manufacture of the coil sections. Before or after the stator core winding is installed, a distributed sensor probe is threaded through selected hollow core conductors for monitoring the temperature along the coil sections.

12 Claims, 5 Drawing Sheets

DISTRIBUTED TEMPERATURE SENSING SYSTEM FOR STATOR WINDINGS

This invention relates in general to electrical generators and, more particularly, to a novel method and apparatus for monitoring temperature along coils in the stator core of an electric generator or motor.

BACKGROUND OF THE INVENTION

Coil windings of electromagnetic machines such as stator windings of large electric generators or motors are subject to localized hot spots which must be quickly detected and diagnosed in order to prevent coil damage and to allow shutdown before failure. It is also desirable to acquire timely and detailed information concerning the severity and progression of coil stress so that decisions can be made to effect timely preventive actions. In power generation systems, such decisions may involve trade-offs affecting optimum management of electric generating capacity based on the availability and cost of replacement parts and the time that the generator must be off-line for repair.

Continuous monitoring of coil temperature is believed to be the most reliable means for detecting malfunctions in generator or motor stator windings. However, current systems use only indirect monitoring techniques of placing sensors along a coolant flow path and provide, at most, only an average measurement of the temperature variations along each coil section of a winding. Such indirect monitoring of coil temperature is in part due to a hostile coil environment requiring that sensors be remotely positioned from the coils. As a result, measured coolant temperature may be lower than the temperature of potential failure points in the coils. Given the coolant flow rate, the heat transfer rate from the conductor to the coolant, and the relatively large surface area over which the coolant flows, a coil failure may cause extensive damage before being detected by an indirect measurement technique. It is therefore desirable to provide a sensing system which utilizes one or more probes to timely and accurately monitor significant temperature increases along the entire length of each coil section. It is also desirable to provide a system which more precisely locates areas of higher temperatures which may be indicative of potential coil failure. With such a system, timely judgments and decisions can be made to minimize the costs associated with a coil failure.

Generally, probes which are useful for monitoring temperature along a line may be divided into four classes according to the type of information which they provide. Class 4 point monitors measure temperature at a specific single position. It is not believed that point monitors provide sufficient data for rapid detection and diagnosis of failures occurring along a coil winding. Class 3 distributed monitors measure the magnitude of a maximum temperature along a line. Class 2 location specific distributed monitors are capable of providing the magnitude and position at which a maximum temperature occurs along a line. Class 1 location-temperature distributed monitors are capable of measuring the temperature at a plurality of positions, thus providing a temperature profile along a line.

It is believed that distributed temperature sensing systems have not been developed in the past for monitoring coil windings because of difficulties in meeting the strict and sometimes conflicting mechanical and electrical requirements associated with generator stator environment. A distributed sensing system suitable as an on-line temperature monitor in a power plant environment must be compatible with the high voltage dielectric requirements of the stator winding insulation and must have little or no signal drift over the normal operating temperature range. It is also required that any probe used in the sensing system have a longitudinal degree of freedom along the coil length in order to avoid thermally induced strain which may alter the temperature measuring characteristics of the probe. Therefore, the probe cannot be directly bonded to either the metallic conductor or the insulating groundwall of the winding coil. Furthermore, if the probe is bonded to the groundwall, differential thermal expansion between various materials may cause a fracture of the probe. On the other hand, a distributed sensing probe which is positioned with a longitudinal degree of freedom in the insulating groundwall will introduce voids in the dielectric which lead to electrical discharge (partial discharge) and significantly shortened life of the groundwall.

SUMMARY OF THE INVENTION

It is an object of the invention to provide an improved temperature monitoring system which overcomes the above discussed limitations and disadvantages, as well as others, of the prior art.

It is another object of the present invention to provide a distributed temperature sensing system and method of monitoring temperature fluctuations along a stator coil winding, which system and method are consistent with the mechanical and electrical requirements of a stator core and consistent with the dielectric properties of the stator winding insulation.

It is a further object of the present invention to provide a temperature sensor system for a stator winding comprising a plurality of distributed temperature probes each having a longitudinal degree of freedom along each stator coil section, wherein the system introduces no voids in the insulating groundwall wall of the coil sections.

It is another object of the present invention to provide a distributed temperature sensing system for the half turn coil sections in a stator winding which system allows for the ganging of half-turn distributed temperature probes in series in order to form a sensing system for the entire winding, the system permitting the replacement of a probe without destruction of the coil or comprises of the coil insulation.

It is still another object of the present invention to provide a distributed temperature sensing system for stator coils which does not significantly affect or change the overall coil manufacturing process.

In one form of the invention, there is provided a method and a system integrated into the coil sections of a stator winding for monitoring temperatures along the stator winding. The method involves the replacement of several normally solid core strands in each coil section with strands of identical outer dimension each having a relatively small hollow core. The hollow core strands are introduced in lieu of solid strands at the beginning of stator coil manufacture. An infrared optical fiber or other temperature sensing probe is threaded through a hollow core strand in each coil section in order to monitor temperature. Alternatively, the hollow core formed in each strand may comprise or hold an acoustic wave guide of a fluid capable of forming a vapor lock at a specific temperature.

DETAILED DESCRIPTION OF THE INVENTION

With reference to the figures generally, a novel distributed temperature sensing system is described by way of example with particular application to measuring temperatures along individual coils of a water-cooled stator winding in an electric generator. While a preferred embodiment of the invention comprises an infrared fiber optic probe it is to be understood that the inventive sensing system and method may incorporate other distributed temperature measurement techniques which are well known in the art, such as, for example, an acoustic waveguide temperature monitor, Optical Time domain Reflectometry, or an ultrasonic vapor lock temperature monitor.

Figure 1:
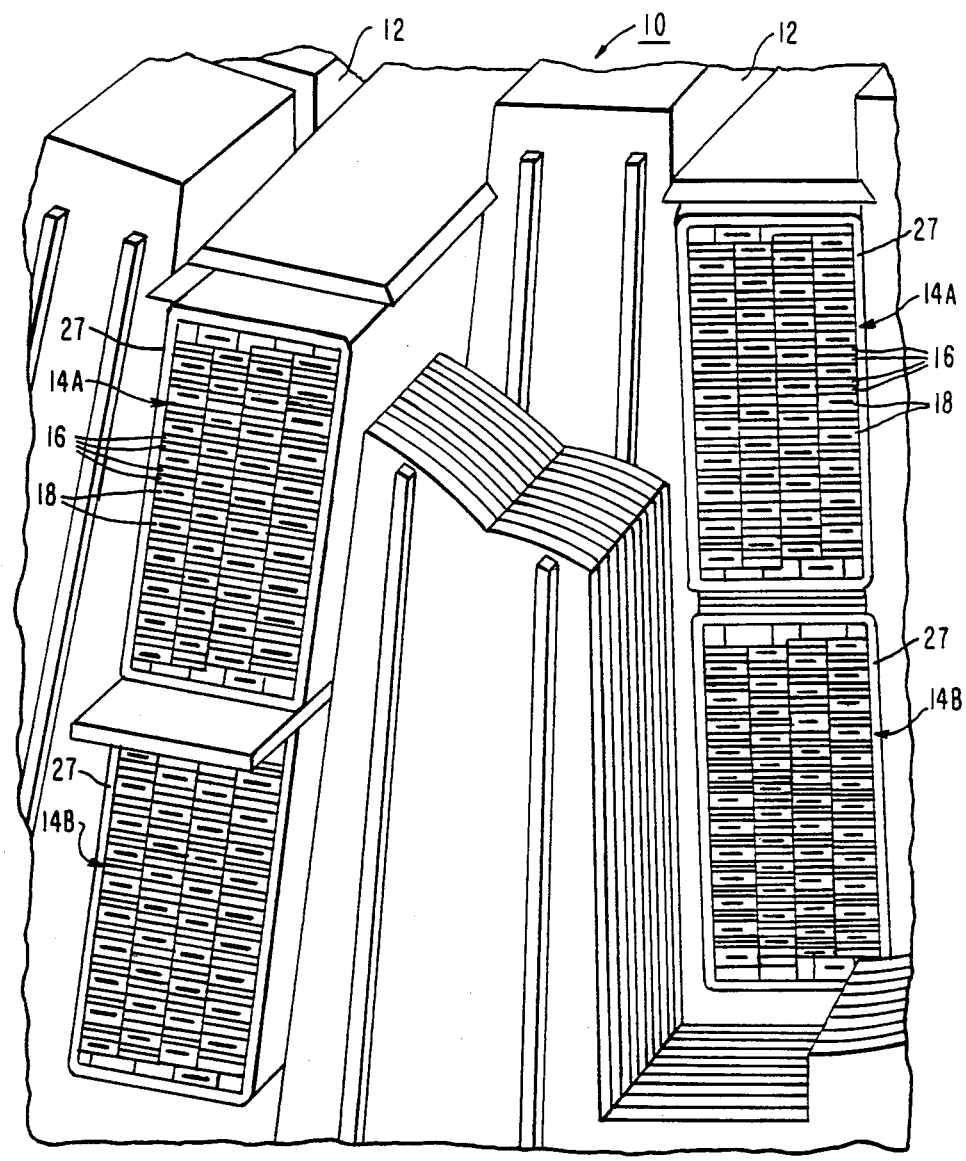
FIG. 1 is a partial view of a stator core.
Figure 2A:
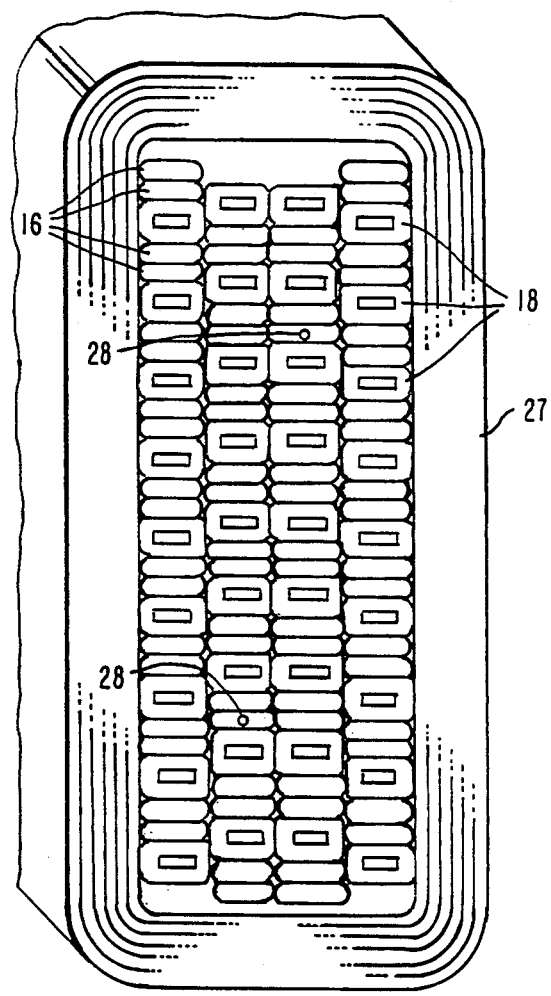
FIG. 2A is a cross sectional view of a water-cooled stator coil.
Figure 2B:
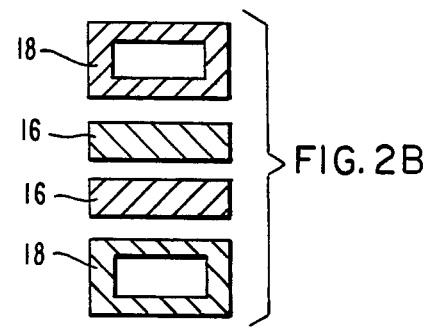
FIG. 2B is a cross-sectional end view of a grouping of hollow and solid core conductor strands in a water cooled coil.

In generators of the type and size often used by power generating utilizes, the stator coils are cooled by pumping a liquid or gas through hollow conductors within the coils or through channels (vent tubes) between columns of conducting strands. Application of the invention is discussed as applied to water cooled stator windings of a large electric generator although similar applications can be made to inner and outer cooled gas windings of generators or motors. FIG. 1 is a cut-away view of a portion of an end of a stator 10 showing only two of a plurality of slots 12 formed in the stator surface for receiving coil winding sections 14. In general, each slot 12 has an upper or outer coil section 14A and a lower or inner coil section 14B. The illustrated winding sections are water cooled and to this end include a plurality of solid conductor members 16 interspersed with a plurality of hollow tubular conductor members 18 in which water circulates. While the conductor members 16,18 in each section are generally referred to as conductive members, they may also be referred to as "strands" and such terms are intended to be interchangeable. FIGS. 2A and 2B illustrate in more detail one of the coil section 14 and the arrangement tubular and solid conductor members 18, 16.

Figure 3:
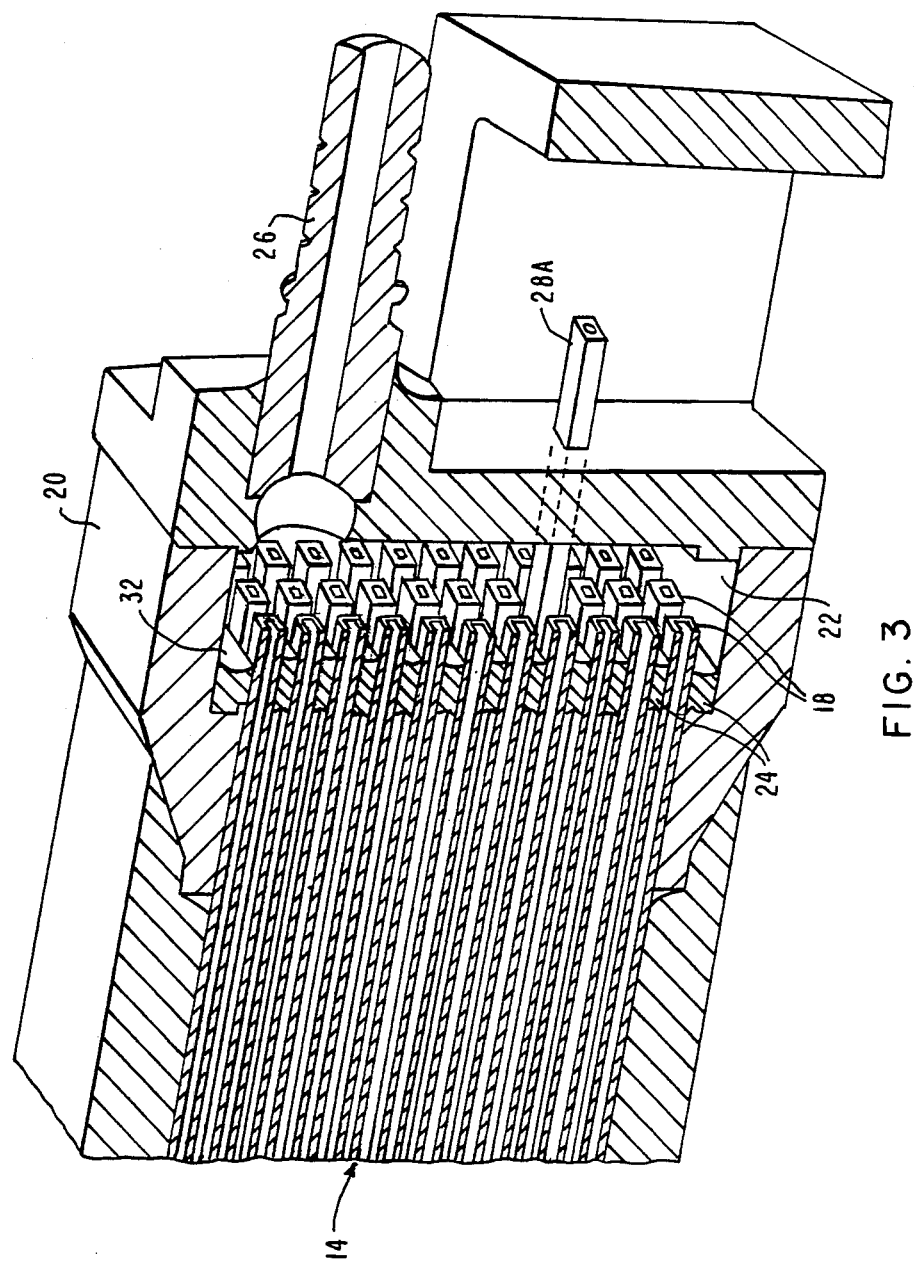
FIG. 3 illustrates the positioning of one hollow core wire strand of the present invention through the end of a coil section.

The tubular members 18 each provide a relatively large surface area along the conductor interior for heat transfer between the conductive metal of the conductor and the circulating water. The water flow path formed in the tubular conductor members 18 is typically rectangular in shape with rounded corners having a cross sectional area of approximately $2 \times 10^3$ square inches. Referring to FIG. 3, each coil section 14 terminates in a sealed header 20 which includes a water reservoir 22. The header 20 also serves as an electrical connector for each coil section 14. The ends of the conductor members 16, 18 are brazed to one another as indicated at 24 to assure electrical integrity and water tightness. Each water reservoir 22 is connected through a Teflon tube 26 to either an inlet or an outlet manifold (not illustrated) in order to effect circulation of cooling water through the tubular members 18. As is best seen in FIGS. 1 and 2, each coil section 14 is wrapped with electrical insulation which forms a void-free insulating groundwall 27. Such insulation may be a micro impregnated dielectric material coated with a semielastic epoxy base.

In a preferred embodiment of the invention, there is provided one or more hollow conductive members 28 in each coil section 14, each suitable for containing a distributed sensor probe 38 which may extend through the plurality of half turn coil sections 14 that form a coil winding. The necessary cross sectional area for placing a probe in the hollow cores of the members 28 is relatively small, e.g., $1.6 \times 10^5$ square inches, in comparison to the strand cross sectional area. One or more hollow strands 28 with the same outer dimension as a one of the solid strands 16 is integrated into each coil section 14 for use as a sheath for containing a sensor probe.

Figure 4:
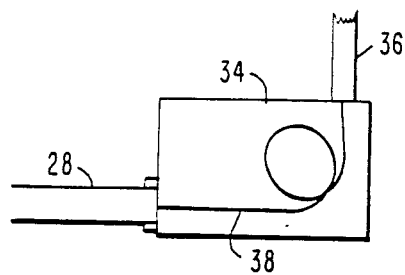
FIG. 4 illustrates a junction box connecting a hollow core wire strand to a protective jacket.

During coil manufacture, the hollow core members 28 are positioned in the coil sections 14 in lieu of some solid conductors 16 and are brazed in an electrical junction 32 formed with the other conductor members 16, 18 at the header 20. The hollow core members 28 may extend through the electrical connecting header 20 as illustrated for one member 28a in FIG. 3 or be brought out through the groundwall insulation 27 at the ends of each half turn (not shown). Each hollow core member 28 is terminated in a junction box 34 (FIG. 4). Each junction box 34 is coupled through a protective sleeve or jacket 36 to another junction box to enable a continuous connection between half-turn coil sections 14 through all or a selected portion of a winding. As will become apparent, the junction boxes 34 provide thermal expansion chambers for containing excess distributed sensor length. A sensor is indicated schematically at 38. The distributed sensor or probe 38 is drawn through the hollow core member 28 after the coil sections 14 have been assembled in the generator stator and electrically interconnected.

Figure 5:
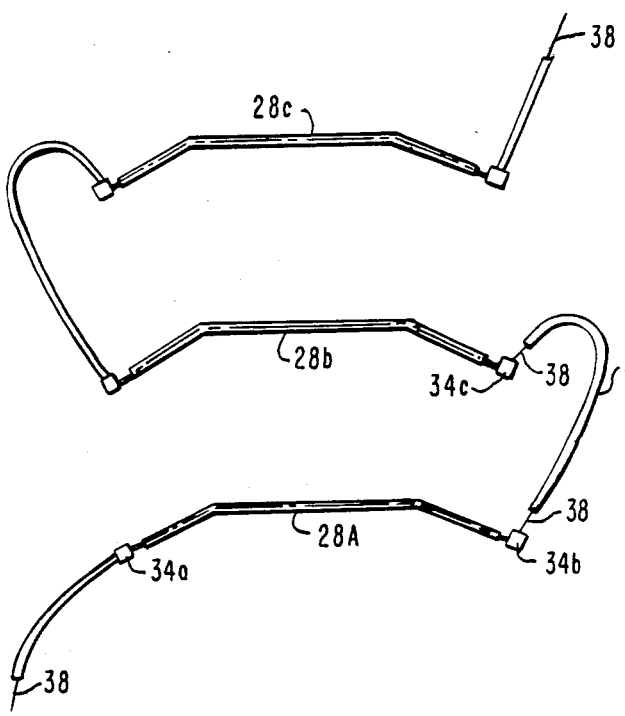
FIG. 5 illustrates the serial connection of hollow core wire strands in different coil sections.

FIG. 5 is a schematic representation of a sensor probe 38 which has been threaded through a first conductor member 28A, a first junction box 34a, a protective jacket 36a, a second junction box 34b, a second conductor member 28b and so on until the probe 38 extends through a complete winding. The number of hollow core conductors 28 and corresponding sensor probes 38 in any coil section 14 varies depending upon the type of coil section and the manner in which the conductors in each section are arranged. The number of sensor probes required thus depends upon the ability of a probe to adequately monitor a coil winding or section. If conductors are placed in predetermined arrays such as would occur in gas-cooled coils, then each array requires a sensor. If a Roebel type winding is used, then each Roebel array requires a sensor.

The preferred method of installing distributed sensors in an electric generator requires the positioning of the hollow core conductor members 28 within an array of electrical conductor members 18 during manufacture of the coil sections 14 so that the hollow core strands are positioned within the conductor which is itself contained within the groundwall 27. This arrangement avoids detection discontinuities. After the coil sections 14 are installed, hollow core member 28 in different coil sections 14 are ganged together using the junction boxes 34. If the sensor or probe 38 comprises an optical fiber probe 40 (FIG. 6), the probe 40 is threaded through each series of ganged hollow core members 28 of a winding 41 until only end portions 42, 44, protrude from opposite ends of the winding. A winding 41 will be recognized as comprising a plurality of coil sections 14.

The optical fiber probe 40 may be an infrared fiber optic probe which emits and transmits radiation in response to coil temperatures below 250° C. and preferably responsive to temperatures ranging from 100° C. to 250° C. Fiber materials suitable for transmission in the portion of the far infrared spectrum, i.e., 2.5 to 10 microns, corresponding to this temperature range, include fluoride glass, chalcogenide materials and silver halide. The fiber emissivity may be longitudinally tailored to create localized regions of increased fiber emission. This makes it possible to construct a quasi continuous monitor which combines the advantages of a Class 4 point monitor with an extended probe. Ion implantations is a known technique for inducing physical and chemical changes in local regions of an optical fiber to alter the absorption and emissivity of the glass. Such changes can be made in discrete segments along the length of a fiber and as a function of radial penetration into the fiber.

Figure 6:
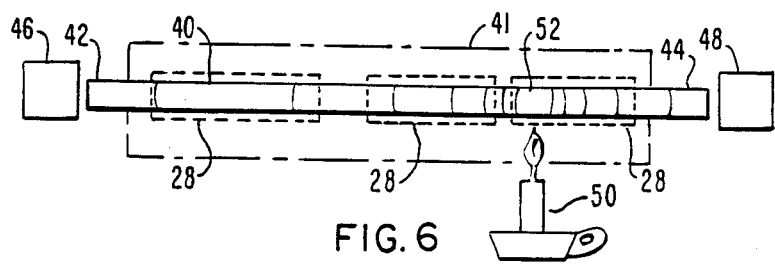
FIG. 6 illustrates an arrangement for monitoring temperature in a hollow core strand with an optical fiber.

An arrangement in which a fiber optic probe can be used as a Class 3 distributed temperature sensor is illustrated in FIG. 6. An optical fiber probe 40 is shown placed within a hollow core member within a winding 41. First and second infrared detectors 46 and 48, each capable of measuring radiation intensity in two different narrow frequency bands, are positioned to receive radiation from the first and second ends 42 and 44 of the fiber probe 40. In operation, heat conducted from a source 50 such as, for example, an insulation or strand failure, penetrates through the wire strand or conductive member 28 and forms a hot spot 52 in the fiber probe 40. The hot spot emits a relatively intense infrared spectrum compared to other portions of the fiber probe 40. The elevated fiber temperature also causes a shift in the infrared spectrum emitted from the fiber hot spot 52. By measuring the relative radiation intensity between two frequency bands of the infrared spectrum reaching the first end 42 of the fiber with the first detector 46, the elevated temperature of the hot spot 52 can be determined from Planck's law. By comparing the intensity measured in one frequency band at each end of the fiber probe 40 with the detectors 46 and 48, the position of the hot spot 40 can be determined based on known attenuation characteristics of the fiber probe 40.

In one form of the invention, the method for monitoring temperature along connected coil sections 14 which are wound about a stator core 10 first includes the step of positioning hollow core conductive members 28 in each array of conductive members 16 in each coil section 14. The hollow core strands 28 in different coil sections 14 are then ganged together in series with junction boxes 34 and an optical fiber probe 40 is threaded through each series of ganged hollow core strands 28 with each end 42 and 44 of each optical fiber probe 40 extending out of a hollow core strand 28. The first infrared detector 46, positioned at a first end 42 of each optical fiber probe 40, is then used for acquiring radiation intensity data indicative of maximum temperature along the optical fiber probe 40. The first and second infrared detectors 46 and 48 positioned at respective first and second ends 42 and 44 of the optical fiber probe 40, are used for acquiring data indicative of the position of maximum temperature along the optical fiber probe 40. The maximum temperature along each optical fiber probe 40 is determined based on Planck's law, using the intensity data for two frequency bands acquired with the first infrared detector 46. More particularly, $$U_\lambda = \frac{8\pi ch}{\lambda^5} \left[ \frac{1}{(e^{hc/\lambda kT} - 1)} \right]$$

where:
$U_\lambda$, Radiant energy density
$\lambda$, Wave length
c, Speed of light
h, Planck's constant
k, Boltzman's constant
T, Absolute temperature The position of maximum temperature along each optical fiber probe 40 is determined based on a comparison of the relative intensity in one radiation frequency band measured at each end of the optical fiber probe 40.

In a first alternate embodiment of the present invention, the hollow core strands 28 in each coil section 14 may be used for acoustically monitoring temperature change along individual coil sections 14. The acoustic method is based on transmission and/or reflection through a waveguide. The waveguide may comprise a probe one millimeter in diameter, serially threaded through hollow core strands 28 in connected coil sections 14. The probe may be formed from fiberglass, Kevlar or graphite and coated with a polyester or epoxy surface. Alternatively, the acoustic probe may comprise a capillary tube filled with a high vapor pressure fluid, or the hollow core strands 28 may be directly filled with the fluid and connected to strands in other coil sections 14 with fluid filled tubes. The primary consideration is provision of a continuous acoustic medium having no significant discontinuities which might cause unwanted reflections of an acoustic probe signal. Portions of the waveguide which undergo temperature shifts will exhibit changes in physical density or another elastic parameter, forming acoustic discontinuities which are detectable based on reflections of a probe signal. The coefficient of reflection across the discontinuity is proportional to the temperature differential between the portional of the waveguide containing the discontinuity and the remainder of the waveguide. Thus, high frequency acoustic signals transmitted through a waveguide will be partially reflected at a discontinuity and partially transmitted through the discontinuity in proportion to the temperature differential.

Figure 7:
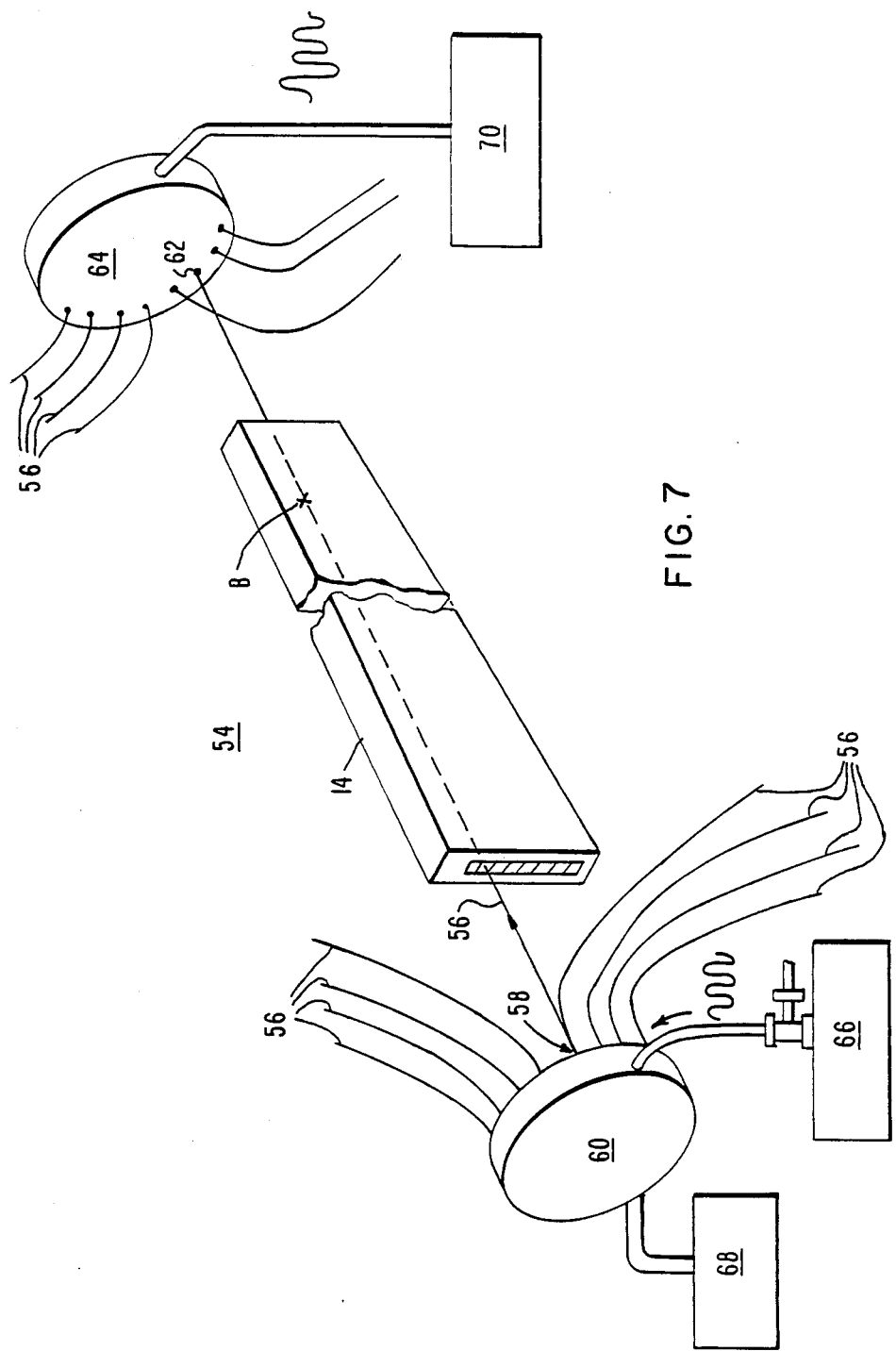
FIG. 7 illustrates a system for monitoring temperature in a hollow core conductor strand using acoustic techniques.

By way of example, FIG. 7 illustrates in simplified form the operation of an acoustic monitoring system 54 for measuring temperature shifts and the position of temperature shifts in a coil section 14. With a waveguide 56 threaded through a coil section 14, a first end 58 of the waveguide is coupled to a first acoustic transducer 60 and a second end 63 of the waveguide 56 is coupled to a second acoustic transducer 64. A signal generator 66, coupled to the first transducer 60 transmits a high frequency, e.g., 50 Mhz, acoustic probe signal into the waveguide 56. The first and second transducers 60 and 64 are coupled to first and second pulse detectors 68 and 70 for monitoring reflective and transmitted pulses and their arrival times. If the waveguide 56 has a significant hot spot positioned about a point B, illustrated in FIG. 7, the corresponding density variation will cause a significant portion of a probe signal emitted from the first transducer 60 to reflect back to the first transducer 60 for detection. After discounting the effects of signal attenuation, the relative intensity of the reflected signal, as measured by the first pulse, detector 68, compared to the initial intensity of the transmitted probe signal, is an index of temperature near point B. Similarly, the relative intensity of the transmitted signal received by the second transducer 64 and measured by the second pulse detector 70, compared to the initial intensity of the probe signal may also provide an index of temperature near point B. The distance from the first transducer 60 to point B is the product of the acoustic wave speed and one half the elapsed time between transmission of the probe signal and reception of the reflected signal. The acoustic monitoring system 54 may be implemented for a plurality of coil sections 14 by connecting a plurality of waveguides 56 to the first and second transducers 60 and 64 with each waveguide positioned to monitor the interior of a different hollow core strand 28.

A second alternate embodiment of the present invention is bases on well known techniques of optical reflectometry, i.e., time domain or frequency domain reflectometry, analogous to the acoustic method of FIG. 7, but wherein an optical fiber probe 40 is threaded through a plurality of coil sections 14 as described for the embodiment illustrated in FIG. 6. An optical probe pulse signal is injected at the first end 42 of the optical fiber probe 40 and an optical detector coupled to receive reflected signal at the first end using a signal splitter. The detector provides time of arrival data for the signals for generating a time display of the intensity of the reflected light pulse. The reflected signals may result from changes in the index of refraction at positions along the optical fiber which index changes with temperature. Thus, the intensity data provide a continuous temperature profile along the length of the fiber. Time domain reflectometry will provide position resolution of approximately one meter and frequency domain reflectometry, which is based on interferometry, will provide position resolution of less than one centimeter.

In another embodiment of the present invention, a bundle of optical fibers probe 40 are threaded through hollow core strands 28 in connected coil sections 14 as illustrated for one optical fiber probe 40 in FIG. 16. Each optical fiber is designed such that at a certain temperature the index of refraction of the fiber cladding exceeds that of the fiber core and the fiber becomes nonguiding. The position at which transmission of a probe signal drops off is determinable based on time domain reflectometry. Since a typical optical fiber is on the order of 100 microns in diameter, a hollow core strand 28 can contain a bundle of fibers, each designed for a different temperature threshold so that a particular distribution of temperatures could be monitored. This threshold system forms a distributed sensor probe which can be monitored with frequency chirped pulsed reflectometry to provide position resolution better than 1 cm.

The principles of the present invention having now been made clear, it will be apparent to those skilled in the art that other techniques for monitoring temperature along a hollow core wire strand will be useful in the practice of the invention. Many modifications in structure, components and arrangements of components illustrated herein may be made in the practice of the invention or adaptation of the invention to specific operating environments. Accordingly, it is to be understood that the above described embodiments of the invention are illustrative only and the present invention is to be limited only as defined by the appended claims.

I claim:

1. Method for monitoring temperature within connected coil sections in a stator core of an electric generator wherein each coil section comprises a plurality of arrays of electrical conductors, the method comprising the steps of:

forming an aperture extending lengthwise through at least one of the electrical conductors to create at least one hollow core conductor in each array of conductors in each coil section;

forming a continuous acoustic waveguide by interconnecting corresponding ones of the hollow core conductors in each of the coil sections of a coil winding;

transmitting an acoustic probe signal into a first end of the waveguide;

detecting the transmitted and a reflected probe signal; and analyzing the detected signal for determining temperature along the hollow core conductor.

2. The method of claim 1 wherein said step of analyzing includes determining a location corresponding to the maximum temperature.

3. Apparatus for monitoring temperature along at least one coil section in an electromagnetic machine having a plurality of selectively interconnected coil sections, each of the coil sections comprising a plurality of electrically conductive strands, the improvement comprising:

at least one hollow core electrically conductive strand positioned in at least one coil section as an integral current carrying conductor, said hollow core being formed so as to act as an acoustic waveguide having first and second ends extending outward of the coil section;

means for transmitting an acoustic signal into the first end of the waveguide;

a first acoustic transducer coupled to the first end of said waveguide for receiving reflected portions of said acoustic signal;

a second acoustic transducer coupled to the second end of said waveguide for receiving portions of said acoustic signal transmitted through said waveguide; and analyzing means coupled to said first and second transducers for deriving from said reflected and transmitted signal portions data representative of the maximum temperature and its location along said waveguide.

4. A method for monitoring temperature within connected coil section forming a coil winding in an electromagnetic machine wherein each of the coil sections comprises a plurality of electrical conductors, the method comprising the steps of:

forming an aperture extending lengthwise through at least one of the electrical conductors to create at least one hollow core electrically conductive member in each of the coil sections;

threading a distributed sensor probe comprising an infrared optical fiber through the hollow core electrically conductive member;

receiving infrared radiation from the probe produced by localized heating of the probe and transmitted to an end thereof through the infrared optical fiber of the probe; and converting the received radiation into data indicative of the temperature of the localized heating.

5. The method of claim 4 and including the additional steps of:

transmitting an optical frequency signal into an end of the optical fiber;

detecting frequency shifts in the optical frequency signal caused by localized heating of the optical fiber; and converting the detected frequency shifts into data indicative of the temperature of the localized heating.

6. The method of claim 4 wherein the method comprises the additional step of transmitting an optical probe signal into the first fiber end in order to generate data indicative of maximum temperature along the hollow core member.

7. The method of claim 4 wherein a first infrared detector is positioned at a first end of the optical fiber, the method further comprising the step of monitoring relative radiation intensity in two infrared frequency bands with the first infrared detector to determine the maximum temperature along the optical fiber.

8. The method of claim 7 wherein a second infrared detector is positioned at a second end of the optical fiber, the method further comprising the step of monitoring radiation intensity in at least one frequency band at both ends of the optical fiber with the first and second infrared detectors to determine the position of maximum temperature along the optical fiber.

9. Method for directly monitoring temperature in a coil section in a stator core of an electric generator or motor wherein the coil section compresses a plurality of arrays of electrical conductors, the method comprising the steps of:

positioning at least one hollow core electrical conductor member in at least one array of conductors;

threading a sensor probe comprising an infrared optical fiber through the at least one hollow core member;

acquiring data from the sensor probe indicative of temperature at determinable locations along the hollow core member; and coupling a first infrared detector to a first end of the optical fiber; and monitoring, with the detector, relative radiation intensity in two infrared frequency bands for acquiring data to determine the maximum temperature along the optical fiber.

10. The method of claim 9 wherein the probe is an infrared optical fiber having first and second ends, the method comprising the additional steps of:

transmitting an optical probe signal into the first fiber end, the probe signal having a frequency such that the signal is effected by thermal gradients in the probe;

detecting variations in the probe signal caused by thermal gradients; and analyzing the detected variations to identify a maximum temperature along the fiber.

11. The method of claim 10 wherein the step of analyzing includes the step of determining a location corresponding to the maximum temperature.

12. The method of claim 9 wherein a second infrared detector is positioned at a second end of the optical fiber, the method further comprising the step of monitoring relative radiation intensity in at least one frequency band at both ends of the optical fiber with the first and second infrared detectors for acquiring data to determine the location of the maximum temperature.

* * * * *